Sept. 15, 1964  P. M. FIELD  3,148,853
FOCUSING MECHANISM FOR PHOTOGRAPHIC APPARATUS
Filed Dec. 6, 1961  2 Sheets-Sheet 1
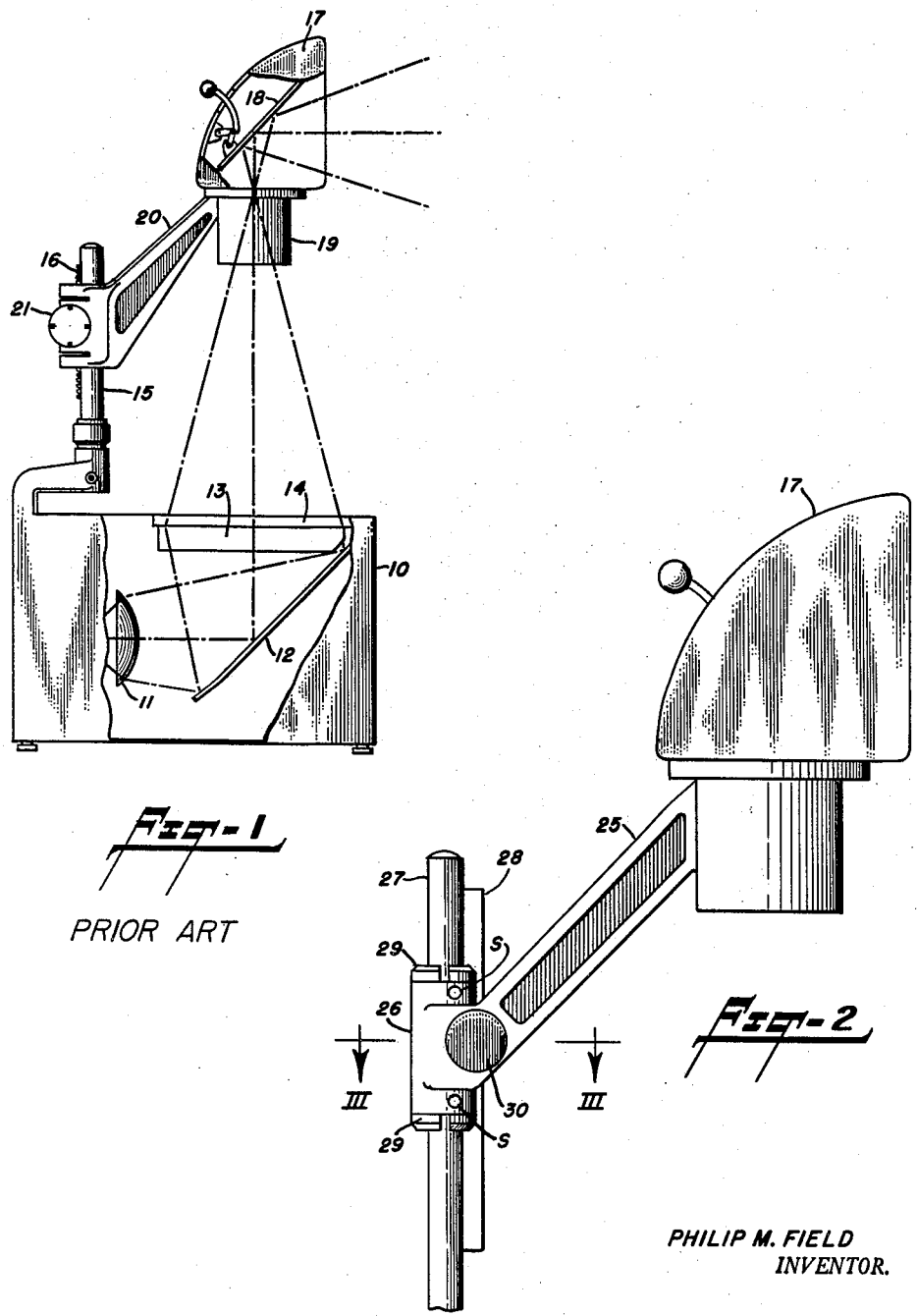
PRIOR ART
PHILIP M. FIELD
INVENTOR.
BY
Rudolph J. Jurick
ATTORNEY Sept. 15, 1964          P. M. FIELD          3,148,853

FOCUSING MECHANISM FOR PHOTOGRAPHIC APPARATUS

Filed Dec. 6, 1961          2 Sheets-Sheet 2

PHILIP M. FIELD
    INVENTOR.

BY
ATTORNEY

3,148,853
FOCUSING MECHANISM FOR PHOTOGRAPHIC APPARATUS

Philip M. Field, Maplewood, N.J., assignor to Charles Beseler Company, East Orange, N.J., a corporation of New Jersey
Filed Dec. 6, 1961, Ser. No. 157,367
2 Claims. (Cl. 248—125)

This invention relates to photographic apparatus and more particularly to an improved mounting structure and focusing arrangement for the projection head of an overhead projector.

Overhead projectors are used in connection with speeches, lectures, educational and sales promotion activities. Such apparatus comprises a housing which carries a light source and associated optical components for directing a vertical light beam through a transparent plate which forms a portion of the top surface of the housing and upon which is placed the material or photographic negative to be projected. A vertical column extends upwardly from the housing and carries the projection head aligned with the light beam axis, said head including a lens and an inclined light reflecting mirror to effect a projection of the image onto a vertical screen.

Focusing of the optical image on the screen is accomplished by adjusting the spacing between the projection head and the material supported by the transparent plate. Heretofore, the focusing mechanism comprised a rack and pinion arrangement, the rack extending along the vertical column and the pinion being coupled to a suitable handle whereby rotation of the handle imparts a vertical movement to the head. It is essential that the axis of the projection head lens coincide with the optical axis of the light beam. In the rack and pinion arrangement, the carriage which is slidable along the vertical column and which carries the projection head, is provided with a vertical keyway for acccommodating the rack. Inasmuch as the keyway must have sufficient clearance to permit easy focusing, and since the distance from the center of the supporting post to the toothed surface of the rack is small in comparison with the distance from the center of the post to the projection head lens, the play between the rack and the keyway results in a large displacement of the lens from the optical axis of the system due to the mechanical amplification. Furthermore, the rack and pinion arrangement involves difficult problems of alignment with the result that mechanical inaccuracies prevent smooth operation of the mechanism. Bad tooth engagement also results in backlash and inaccurate focusing.

An object of this invention is the provision of a novel friction drive mechanism for slidably adjusting a carriage along a fixed supporting post and for retaining the carriage in the adjusted position.

An object of this invention is the provision of an improved, optical focusing arrangement for a projector.

An object of this invention is the provision of a focusing arrangement for a projector which arrangement has zero backlash and zero lateral clearance between the cooperating parts thereby maintaining the projection lens at all times in alignment with the optical axis of the projector.

An object of this invention is the provision of an improved focusing arrangement for a projector which arrangement permits initial setting of the projection lens in relationship to the optical axis of the system, thereby to compensate for possible errors in manufacture.

An object of this invention is the provision of a focusing arrangement for an overhead projector in which friction means are provided for adjusting the spacing between the projection head lens and the projection stage and for retaining the head in the adjusted position.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a view of an overhead projector provided with a conventional focusing mechanism;

FIGURE 2 is a fragmentary view, similar to FIGURE 1, and showing a focusing mechanism made in accordance with one embodiment of this invention;

Figure 3:
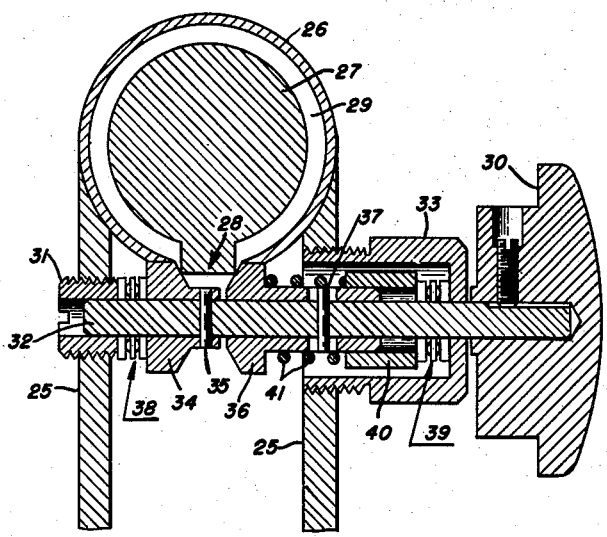
FIGURE 3 is a cross-sectional view taken along the line III—III of FIGURE 2, and drawn to an enlarged scale.

Referring to FIGURE 1, of the drawings, one form of overhead projector, of the class contemplated by this invention, comprises a housing 10, which carries a lamp (not shown), a condensing lens 11, a light-reflecting mirror 12, a Fresnel lens 13 and a transparent plate, or stage 14, the latter serving as a support for the film or other material to be projected. Rigidly supported on the housing is a vertical post 15 having a toothed rack, or key 16, secured thereto and extending longitudinally thereof. A projection head 17, carrying an inclined, light-reflecting mirror 18 and a lens 19, is carried by a bracket, or carriage, 20 which is provided with a hole and a keyway respectively accommodating the post and the rack. A pinion gear, not visible in the drawing, is secured to a handle 21 and is in mesh with the teeth formed on the rack 16 whereby rotation of the handle, in one or the other direction, produces a corresponding movement of the bracket 20 relative to the post, thereby altering the distance between the projection head and the stage 14 for the purpose of focusing the projected image on a vertical screen.

Inasmuch as the keyway, in the carriage 20, must have sufficient clearance to permit easy focusing, and since the lateral distance from the center of the supporting post to the root of the teeth on the rack is small in comparison with the distance from the center of the post to the lens 19, any small movement because of the clearance between the rack and the keyway results in a relatively large displacement of the lens from the optical axis of the light beam. Also, the rack and pinion arrangement presents problems of alignment of the cooperating tooth elements and bad tooth alignment results in backlash. These factors prevent smooth operation of the mechanism with attendant difficulty in obtaining and maintaining accurate focusing.

The shortcomings of the FIGURE 1 rack and pinion mechanism are overcome by the novel mechanism shown in FIGURES 2 and 3. Here, the carriage 25, carrying the projection head 17, terminates in a cylindrical sleeve 26 that is slidable over the vertical supporting post 27. The longitudinally-extending key 28, of uniform cross-section, is shown formed integral with the post although it will be apparent the key can be a separate unit welded to the post. The ends of the sleeve 26 are undercut to receive the reduced diameter portions of the flanged collars, or bearings, 29, which bearings are provided with radial slots to accommodate the key 28. Adjusting screws S, passing through threaded holes formed in the sleeve 26, provide means for adjusting the fit of each bearing about the post 27, thereby obviating the necessity for precise machining of the parts to promote smooth sliding movement of the carriage along the post in response to rotation of the handle 30.

An externally threaded reacting screw 31 is disposed within a threaded hole formed in one of the carriage arms 25 and serves as a bearing for one end of the shaft 32, the other end of the shaft passing through a clearance hole in the externally threaded cap nut 33 and having the handle 30 secured thereto as by a set screw. A first friction disc 34 is secured to the shaft 32 by a tight-fitting pin 35. A second friction disc 36 is mounted on the shaft in such manner as to permit a limited sliding movement along the shaft but no angular rotation about the shaft. This is accomplished by means of a pin 37 force-fitted into a radial hole formed in the shaft and extending through a longitudinal slot formed in the shank of the friction disc 36, as shown. A first thrust bearing 38 is positioned between the screw 31 and the friction disc 34 and a similar bearing 39 is positioned between the base wall of the cap nut 33 and the end of a tubular bushing 40, which is slidable over the shank of the friction disc 36. Encircling the shank of the friction disc 36 is a coiled compression spring 41, having one end abutting the head of the friction disc 36 and the other end abutting the proximate end of the tubular bushing 40.

It will be noted that the facing surfaces of the two friction discs 34, 36 are conical and engage opposed edges of the key 28. The magnitude of the pressure exerted by the conical surfaces of the friction discs against the key is adjustable by merely rotating the cap nut in one or the other direction, it being readily apparent that rotation of the nut in one direction compresses the spring, whereas a rotation of the nut in the other direction permits axial extension of the spring. It may here be pointed out that the nut 33 has a knurled outer surface to facilitate such adjustment. One important feature of my novel friction drive arrangement lies in the fact that pressure applied by the coiled spring 41 to effect a frictional movement of the sleeve 26 along the post 27 simultaneously and advantageously eliminates all clearance between the two friction discs and the key 28.

The pressure of the friction discs against the key is adjusted so that the carriage can readily be moved up or down, along the post 27, by rotation of the handle 30, thereby to adjust the focus of the projection head, yet the structure will remain in any position along the supporting post to which it has been set. Furthermore, the reacting screw 31 provides a convenient, efficient means for establishing the required initial alignment of the projection head along the optical axis of the projector. Rotation of the screw 31 inwardly of the bracket arm 25 forces a rotation of the bracket, and the projection head, in a clockwise direction, as viewed in FIGURE 3. A reverse rotation of the screw 31 tends to develop a clearance between the friction disc 34 and the key 28, but such clearance is simultaneously taken up by the pressure exerted against the key by the friction disc 36 under the axial force continuously imparted to such disc by the compressed spring 41. The net result is a rotation of the bracket axis in a counterclockwise rotation about the post.

Figure 4:
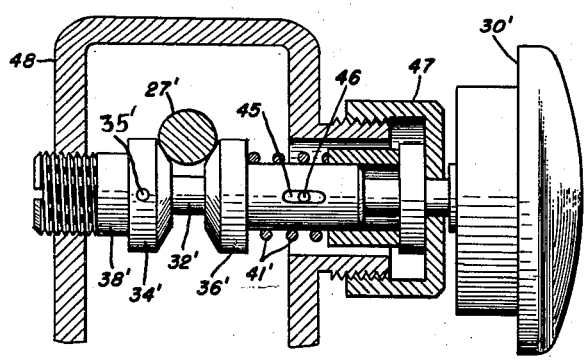
FIGURE 4 generally is similar to FIGURE 3 and showing another embodiment of the invention.

A modified and somewhat simplified arrangement of the friction drive arrangement is illustrated in FIGURE 4, which is a cross-sectional view generally similar to that of FIGURE 3. Here, the key has been dispensed with and the facing, conical surfaces of the friction discs 34', 36' directly engage the circular post 27' of reduced diameter. The friction disc 34' is securely pinned to the shaft 32', as by the pin 35' and abuts against the thrust bearing 38' under the action of the compression spring 41'. As in the FIGURE 3 arrangement, the friction disc 36' has a longitudinal slot 45 formed in the shank for receiving the pin 46 that is force driven into a radial hole provided in the shaft. Rotation of the cap nut 47 adjusts the pressure exerted by the friction discs against the post. Rotation of the handle 30' effects an up or down translation of the carriage 48 along the post 27'.

The friction drive mechanisms shown in FIGURES 3 and 4 are useful in connection with any apparatus wherein an adjustment, or axial translation, of the carriage along a fixed supporting post is required. However, the FIGURE 3 embodiment of the invention is particularly useful in an overhead projector since it includes a simple, positive means for alignment of the projection head with respect to the optical axis of the projector and for automatically retaining the head in such aligned position. As is clear from a study of FIGURE 3, the pressure of the spring 41, applied axially of the shaft 32, results in the engagement of the two friction discs with the proximate edges of the post 27 along points of equal radius taken from the center of the shaft. Any forceful rotation of the bracket 25, about the post, will cause one edge of the key to ride up on one friction and down on the other, thereby destroying the static force balance of the system. Consequently, upon removal of the external force applied to the bracket, the pressure exerted by the compression spring restores the normal force balance condition wherein the shaft 32 is normal to the median plane passing through the key. In the FIGURE 4 system, the normal force balance condition obtains irrespective of the angular position of the carriage 48 relative to the post 27' since the points of contact between the post and the conical surfaces remains unchanged. In consequence, with the FIGURE 4 arrangement, the optical alignment of the projection head is effected by merely rotating the carriage about the post by hand, the frictional force between the friction discs and the post being relied upon to retain the carriage in the set, angular position during normal use of the apparatus. However, the FIGURE 4 arrangement is particularly adapted for use in a photographic enlarger wherein the carriage carrying the light source, etc., is slidably supported on two, spaced posts, thereby eliminating any possibility of carriage rotation.

Having now described the invention, changes and modifications will readily occur to those skilled in this art, and it is intended that such changes and modifications shall fall within the scope and spirit of the invention as recited in the following claims.

I claim:

1. A focusing mechanism for an overhead projector, of the type having a housing, a vertical post projecting up from said housing, a projection head with an inclined light-reflecting mirror and a lens carried by said post, a lamp, a condensing lens, a mirror for reflecting light from said lamp to said first mentioned mirror, a lens through which said reflected light passes and a transparent plate to serve as a support for material to be projected, carried by said housing, said mechanism comprising:

(a) a carriage slidable along and rotatable about the post, in effecting said focusing, said carriage including a pair of spaced arms holding said projection head, (b) a shaft rotatably mounted in and extending between said arms, and spaced from said post, (c) a first friction disc fixedly secured to said shaft and having a conical surface engaging a part of said post, (d) a second friction disc having a corresponding conical surface engaging another part of said post, said disc being rotatable with the shaft and slidable therealong, (e) a screw threaded into a hole formed in one of said arms and having an axial hole within which one end of said shaft is rotatably disposed, (f) a bearing between the inner end of said screw and said first mentioned friction disc, (g) a handle mounted on the opposite end of said shaft for turning the same.

(h) a cap nut threaded into said other arm and telescoping over the adjacent end of said second disc, (i) a bearing in and between said cap nut and said second disc, and (j) a spring acting between said bearing and said second disc for biasing the second disc toward the first disc, whereby they resiliently engage said post, so that turning of said handle causes the carriage to travel along said post and effect focusing of said head.

2. The invention as recited in claim 1, including (k) a cylindrical sleeve member formed as part of said carriage and slidable along and rotatable about the post in effecting said focusing, said sleeve member being the part which terminates in the pair of spaced arms, (l) means forming a longitudinal slot in the wall of the sleeve member, (m) a longitudinally-extending key fixed with respect to the post, said key protruding through the slot formed in the sleeve member, (n) the conical surface of said first friction disc engaging one edge of said key, (o) the conical surface of the second friction disc engaging the opposite edge of said key, whereby turning of the screw causes rotation of the head about the post in one direction, and turning of the screw in the opposite direction causes opposite head rotation, for focusing purposes.

References Cited in the file of this patent

UNITED STATES PATENTS

| | | |
|---|---|---|
| 1,485,796 | Merseles | Mar. 4, 1924 |
| 2,060,981 | Fischer | Nov. 17, 1936 |
| 2,429,696 | Merkt | Oct. 28, 1947 |
| 2,590,484 | Youhouse | Mar. 25, 1952 |
| 2,880,515 | Vice | Apr. 7, 1959 |

FOREIGN PATENTS

| | | |
|---|---|---|
| 261,476 | Great Britain | Nov. 19, 1926 |